3,343,601
WATER FLOODING PROCESS
David J. Pye, Alamo, Calif., assignor to The Dow Chemical Company, Midland, Mich., a corporation of Delaware
No Drawing. Filed Sept. 17, 1965, Ser. No. 488,278
6 Claims. (Cl. 166—42)

The present invention concerns an improved water-flooding process, and more particularly, inhibiting ferric hydroxide plugging of water-flood injection wells.

It is known that the presence of oxygen in water-flooding media promotes corrosion of metal equipment contacting such media and the conversion of soluble ferrous compounds into insoluble ferric hydroxide. Due to its gelatinous nature, ferric hydroxide will quickly plug a water-flood injection well. As a consequence, it is common practice to use closed injection systems to keep contact of the injection fluids with the atmosphere at a minimum.

Even in a closed system, however, some oxygen is likely to leak into the injection fluid. Moreover, aqueous media from which the injection fluids are prepared often contain as much as 10 parts per million by weight of dissolved oxygen. Such amounts of oxygen in the presence of soluble ferrous ions under pH conditions normally employed in water flooding operations, i.e., from neutral to slightly basic, cause the formation of ferric hydroxide.

Techniques that have been employed to minimize this problem include the use of ferric ion chelating agents. For instance, it is known to minimize well plugging by incorporating citric acid in the flood waters. This converts the insoluble ferric ions to soluble chelates which are swept on into the formation being flooded by the driving injection fluids. While this technique is highly effective for the intended purpose, it is most disadvantageous when practiced in conjunction with the addition of polymeric, mobility control agents to the injection fluids. The presence of citric acid in the injection fluid upsets the normal equilibrium between insoluble ferric species and their soluble ferrous precursors. As a result, the conversion of ferrous to ferric species proceeds at an accelerated rate, even in the presence of very small amounts of oxygen. It has been discovered that this effect causes severe degradation of any polymeric additives that may be present in the injection fluids. Such degradation leads to decreased efficiency in terms of decreased mobility control of the injection fluids.

Another technique, which would appear to have potential for the control of insoluble ferric species, is the use of a chemical, oxygen scavenger in the injection water. In fact, it has been suggested to employ certain chemicals of this class, such as soluble sulfite ions or hydrazine, as oxygen scavengers to minimize corrosion of equipment utilized for carrying out the water flooding process. While the sulfite or hydrazine will prevent corrosion and related introduction of ferrous ions into the injection fluids, very small amounts of oxygen will oxidize ferrous ions already in the fluid to ferric hydroxide, even when corrosion is effectively controlled by an oxygen scavenger.

It would be desirable, and it is an object of the present invention, to provide a novel water flooding process in which formation plugging with ferric hydroxide is effectively controlled. More especially, it is an object to obviate ferric hydroxide plugging with reagents which maintain the effectiveness of polymeric co-additives incorporated into the injection fluids for mobility control. A still further object is to provide non-corrosive injection fluids in which the oxidation of ferrous to ferric ions is effectively inhibited. A further benefit flowing from the discovery of the present invention, is the provision of a treatment for aqueous injection fluids in which any insoluble ferric hydroxide already present therein is reduced to soluble ferrous ions. The above objects, an other benefits as will be apparent hereinafter, are accomplished in accordance with the present invention.

The present invention concerns an improved water flooding process for the secondary recovery of oil in which aqueous fluid is injected into an oil bearing formation and displaced oil is recovered from the same formation. Particularly, the invention concerns incorporating into the aqueous injection fluid, a small but effective amount of a water-soluble hydrosulfite, such as for example potassium, sodium or ammonium hydrosulfite, to obviate or at least reduce, the plugging of the oil formation by ferric hydroxide. Incorporation of the hydrosulfite eliminate oxygen-promoted corrosion of equipment and, at the same time, prevents the oxidation of ferrous chemical species to insoluble ferric hydroxide. A most valuable aspect of the use of the hydrosulfite ion is its compatability with water soluble, polymeric mobility control agents that may be incorporated into the injection fluid. Such use of the hydrosulfite ion has a further and most unique advantage of reducing and solubilizing insoluble ferric hydroxide which may be present in the injection fluid prior to incorporation of the hydrosulfite additive.

In carrying out the invention, the hydrosulfite additive is incorporated into an aqueous injection fluid in any convenient manner. The amount used is preferably just the minimum required to prevent plugging. Beneficial result are realized, however, using as little as 5 up to as much as 10,000 parts per million by weight of the additive, based on the weight of the injection fluid. Although, it is not necessary, it is preferred to practice the invention in a closed injection system, i.e., a system in which contact with the atmosphere is kept to a minimum. When polymeric mobility control agents are also being incorporated into the aqueous injection fluid, the polymer and hydrosulfite may be added simultaneously or in any order. It is best, however, to incorporate the hydrosulfite additive prior to the addition of the polymeric additive. This minimizes the amount of mixing required subsequent to the addition of the polymer, and moreover, ideally conditions the aqueous injection fluid for receiving the polymeric additive by eliminating one of the conditions i.e., the presence of oxygen, which can promote molecular degradation of the polymer.

Having prepared an aqueous injection fluid containing a hydrosulfite additive of the invention, with or without a water-soluble polymeric mobility control agent, the aqueous injection fluid is introduced through an injection well, or wells, into the oil-bearing formation. The displaced oil is recovered at one or more producing wells removed from the injection well, or it may be recovered through a second passage in the injection wells according to the single well secondary recovery process of U.S. Patent 3,172,470. Aqueous liquids that may be employed to prepare the injection fluids include fresh water, oil field brines, ocean water and in general any aqueous fluid which may be available at the oil field site for practice of the invention.

Water-soluble, polymeric mobility control agents often employed include the acrylic amide polymers such as homopolymers of acrylamide and copolymers thereof with acrylic acid, methacrylic acid and alkali-metal salts of such acids. Other classes of polymeric mobility control agents include the water-soluble alkylene oxide polymers, polymer sulfonates, polyvinyl alcohols, esters and amides of styrene-maleic anhydride copolymers, and in general any of a wide number of water-soluble, high molecular weight polymers which enhance the viscosity of aqueous fluids. Teachings with respect to such polymers are found in U.S. Patents 2,731,414; 2,827,964; 2,842,492; 3,018,826; 3,039,529; 3,079,337; and 3,085,063.

The following examples provide further illustration of present invention.

Example I

In this example comparative data are presented to show compatability of a hydrosulfite additive with a water-soluble, polymeric mobility control, additive for water-flood injection fluids.

A simulated brine flooding medium was prepared as a water solution of 21.3 grams per liter of sodium chloride, 5.8 grams per liter of sodium sulfate, 1.7 grams per liter of magnesium chloride hydrate and 2.6 grams per liter of calcium chloride. The brine was characterized by a pH of 6.85. To the brine was added a high molecular weight polyacrylamide of demonstrated mobility control use. In the polymer, about 20 percent of the amide groups had been hydrolyzed to sodium carboxylate groups. Enough of the polymer was incorporated into the brine to provide 0.50 percent by weight polymer. The brine-polymer solution was divided into 350 milliliter aliquots which were individually treated as shown in the following table. After thirty minutes, the viscosity of the treated brine polymer solution was determined with a Brookfield viscosimeter.

TABLE I

| Aliquot | Treatment | Viscosity (cps.) |
|---|---|---|
| 1 | 12 ml. of $H_2O$ | 12 |
| 2 | 100 p.p.m.[1] of sodium hydrosulfite in 12 ml. of $H_2O$. | 11.2 |
| 3 | 100 p.p.m.[1] of sodium hydrosulfite plus 10 p.p.m.[1] of $Fe^{++}$ in 12 ml. of $H_2O$. | 11.2 |
| 4 | 100 p.p.m.[1] of sodium citrate and 100 p.p.m. of $Fe^{++}$ in 12 ml. of $H_2O$. | 3.7 |

[1] This refers to parts per million by weight based on the weight of the sample.

The above data illustrate that the hydrosulfite has comparatively little adverse effect on the viscosity of the brine polymer solution and that the hydrosulfite is much superior, in the presence of soluble ferrous ions, to sodium citrate, which chelates ferric ion as it is formed.

If the polymer brine solution is permitted to remain in contact with air, it will eventually absorb enough oxygen to destroy the effectiveness of the hydrosulfite as a reducing agent. As this occurs, polymer degradation may be worse than that of the brine-polymer solution without additive. For instance, after twenty hours at room temperature and in the presence of air, aliquot number 1 had a measured viscosity of 12.2 centipoises in contrast to that of aliquot 2 which had dropped to 9.7 centipoises. Although this is not nearly as severe, as degradation caused by the use of the chelating agent for control of ferric ions, it is a serious loss of viscosity, and thus, ability to control mobility of the brine in the oil bearing formation. For this reason it is preferred when polymeric mobility control additives are employed conjunctively with the hydrosulfite, that the combination be utilized in a closed injection system, i.e., one in which contact with the atmosphere is minimized or completely avoided.

Example II

This example illustrates the benefit to be realized in the practice of the invention as it may be applied to the preparation of injection fluids from aqueous fluids containing suspended ferric hydroxide.

To 96 milliliters of an aqueous 3 percent sodium chloride solution was added one milliliter of a 2 percent by weight water solution of sodium bicarbonate. Then, 1 milliliter of an essentially oxygen-free solution of 0.5 percent by weight ferrous sulfate hydrate ($FeSO_4 \cdot 7H_2O$) was added. This provided the solution with about ten parts per million by weight of ferrous ions. The solution was stirred gently in the presence of air until floccules of ferric hydroxide were visible in the solution. At this point the solution had taken on a definite yellow color. Dissolved oxygen was stripped from the solution by bubbling nitrogen through it. The ferric hydroxide floccules and yellow color remained in the solution after removal of the oxygen.

To 98 milliliters of the test solution prepared above was added two milliliters of a 2% by weight water solution of sodium hydrosulfite ($Na_2S_2O_4$). After about twenty minutes, the solution became clear and colorless. The ferric hydroxide floccules had completely disappeared.

To a like aliquot of the ferric hydroxide suspension was added one milliliter of the sodium hydrosulfite solution. The result was substantially identical to that obtained above.

As a comparative experiment, two milliliters of a four percent by weight sodium sulfite ($Na_2SO_3$), solution was added to a third comparable aliquot of the ferric hydroxide suspension. After sixteen hours, the ferric hydroxide had settled with no apparent diminution in quantity. At this point, the addition of two milliliters of the above sodium hydrosulfite caused the precipitate and color to disappear in about 30 minutes.

In still further tests like that above, but using sodium hypophosphite ($Na_2H_2PO_2 \cdot H_2O$) and sodium thiosulfate ($Na_2S_2O_3$) in place of the sodium sulfite, it was again shown that the sodium hydrosulfite was unique in its ability to solubilize pre-existing ferric hydroxide.

Example III

In a field operation, ferric hydroxide plugging of injection wells was encountered upon the start-up of a water flooding operation in which a polymer was used in the flooding medium to improve mobility control. The polymer used was a partially hydrolyzed polyacrylamide in which about 25% of the initially available carboxamide groups had been converted sodium carboxylate groups. About .05% by weight polymer was added to the flooding medium. The resulting flooding medium was characterized by a resistance property (R) equal to about 10.

The term resistance property as used herein is defined by D. Pye in "Improved Secondary Recovery by Control of Water Mobility," Society of Petroleum Engineers, AMIE, Paper No. SPE845.

As a result of the oxidation of soluble ferrous species to ferric hydroxide, polymer degradation occurred to the extent there was a 55% loss in the resistance property of the solution prior to injection. Subsequently, air leaks into the closed system were minimized. This reduced the resistance property loss to about 35%. 50 parts per million by weight of sodium hydrosulfite was then added to the flooding medium. This reduced the resistance property loss to practically zero.

What is claimed is:

1. In a process for the secondary recovery of oil which comprises injecting an aqueous fluid containing a dispersed iron compound into an oil-bearing formation, the improvement which comprises incorporating into the injection fluid a water-soluble, hydrosulfite in an amount sufficient to prevent ferric hydroxide plugging of the formation.

2. A method as in claim 1 wherein the hydrosulfite is added to the injection fluid as an alkali metal salt.

3. In a process for the secondary recovery of oil which comprises injecting into an oil bearing subterranean formation an aqueous solution of a water-soluble, mobility-controlling polymeric additive and a dispersed iron compound, the improvement which comprises incorporating into the injection fluid a water-soluble, hydrosulfite in an amount sufficient to prevent ferric hydroxide plugging of the formation.

4. A method as in claim 3 wherein the hydrosulfite is added to the injection fluid as an alkali metal salt.

5. A process for the secondary recovery of oil which comprises injecting into an oil bearing subterranean formation an aqueous solution having incidental contact with an iron-containing metal during the injection process, said solution containing a water-soluble, mobility-controlling polymeric additive and a water soluble hydrosulfite, the latter component being incorporated into the injection fluid in an amount sufficient to prevent ferric hydroxide plugging of the formation; whereby oil is displaced in the oil-bearing formation.

6. A process as in claim 5 wherein the polymeric additive is a water-soluble acrylamide polymer and the hydrosulfite is added to the injection fluid as an alkali metal salt.

References Cited

UNITED STATES PATENTS

| 2,787,326 | 4/1957 | Hughes | 166—42 |
| 3,163,213 | 12/1964 | Bernard | 166—9 |
| 3,203,480 | 8/1965 | Froning | 166—9 |
| 3,258,070 | 6/1966 | Reusser | 166—9 |
| 3,258,072 | 6/1966 | Froning | 166—9 |

CHARLES E. O'CONNELL, *Primary Examiner.*

JAMES A. LEPPINK, *Examiner.*